United States Patent [19]

Jorgensen

[11] Patent Number: 4,880,128

[45] Date of Patent: Nov. 14, 1989

[54] FIXTURE BOX FOR CEILING FAN SUPPORT

[75] Inventor: Robert W. Jorgensen, Niles, Mich.

[73] Assignee: Hubbell Incorporated, Orange, Conn.

[21] Appl. No.: 285,819

[22] Filed: Dec. 16, 1988

[51] Int. Cl.$^4$ .............................................. H02G 3/08
[52] U.S. Cl. ....................................................... 220/3.9
[58] Field of Search ................. 220/3.9, 3.8, 3.5, 3.3, 220/3.2

[56] References Cited

U.S. PATENT DOCUMENTS

| | | | |
|---|---|---|---|
| 1,906,197 | 4/1933 | Mangin | 220/3.9 X |
| 2,214,968 | 9/1940 | MacMillen | 220/3.9 |
| 3,075,487 | 1/1963 | Appleton | 220/3.2 |
| 3,187,922 | 6/1965 | Hoskins et al. | 220/3.8 X |
| 3,197,548 | 7/1965 | Weitzman et al. | 174/58 |
| 3,345,029 | 10/1967 | Palmer | 220/3.9 X |
| 3,490,637 | 1/1970 | Pope | 220/3.8 X |
| 3,630,406 | 12/1971 | Hammes | 220/3.3 |
| 3,977,640 | 8/1976 | Arnold et al. | 220/3.9 X |
| 4,057,164 | 11/1977 | Maier | 220/3.6 |
| 4,176,758 | 12/1979 | Glick | 220/3.3 |
| 4,770,311 | 9/1988 | Wang | 220/3.3 |

*Primary Examiner*—Steven M. Pollard
*Attorney, Agent, or Firm*—Jerry M. Presson; Alfred N. Goodman

[57] ABSTRACT

A fixture box for supporting a ceiling fan or other fixture. The fixture box comprises a top portion, a side portion coupled to the top portion, a continuous flange coupled to the side portion along the entire periphery of the side portion, and a pair of mounting holes formed in the flange. The mounting holes in the continuous flange receive mounting screws from the ceiling fan or fixture. The fixture box itself is secured to a joist or other structural support. In a modified embodiment, the fixture box includes a mounting bracket especially adapted to mount the fixture box to a joist or other structural support. The continuous flange of the fixture box advantageously resists fatigue due to dynamic loading of the ceiling fan or fixture.

20 Claims, 2 Drawing Sheets

FIXTURE BOX FOR CEILING FAN SUPPORT

FIELD OF THE INVENTION

The invention relates to a fixture box having a continuous flange for directly mounting a ceiling fan support thereto. The fixture box alone, or with an attached mounting bracket, is secured to a joist or other structural support member and supports the ceiling fan support thereon. More specifically, the invention relates to improving the resistance of the fixture box flange to fatigue resulting from the dynamic loads of an unbalanced ceiling fan.

BACKGROUND OF THE INVENTION

Ceiling fans have become increasingly popular in today's homes and businesses, such as restaurants. In the past, ceiling boxes for supporting the fans were tested under static loads only. With the increasing popularity of ceiling fans came the concern that the dynamic loads of an unbalanced ceiling fan could cause the mounting flanges of the ceiling boxes to flex and eventually break off. This concern lead to a new 1987 N.E.C. code provision (N.E.C. 370-17C) that required ceiling boxes intended to be used as the sole support of ceiling fans to be tested and listed for that use. Underwriters Laboratories (U.L.) responded with a new test which no standard ceiling box has yet been able to pass.

The prior art ceiling boxes are made of metal and have a pair of mounting flanges with a threaded mounting hole extending through each flange. In essence, these flanges are small ears formed integrally with the wall of the box and bent inwardly. The ceiling fan is attached to the ceiling box by a pair of mounting screws which are threadedly received in the mounting holes of the pair of flanges.

The problem with these prior art ceiling boxes is that the unbalanced dynamic loads cause the fan to rock back and forth, which in turn flexes and ultimately fatigues the flanges of the metal ceiling box until they break off.

Also, it is common practice to secure a ceiling box to a mounting bracket and then to mount the mounting bracket to a joist or other structural support. However, such mounting brackets are typically spot welded to the ceiling boxes and the cyclic loading of unbalanced ceiling fans causing the spot welds to fatigue and break.

Examples of same prior disclosures of electrical boxes having various flange constructions are shown in the following U.S. Pat. Nos. 3,075,487 to Appleton; 3,630,406 to Hammes; 4,057,164 to Maier, and 4,176,758 to Glick.

Accordingly, there exists the need for a fixture box which resists the fatigue induced by the dynamic loads of an unbalanced ceiling fan. Also, there exists the need for a fixture box and mounting bracket securing arrangement which resists fatigue induced by the dynamic loads of an unbalanced ceiling fan.

SUMMARY OF THE INVENTION

Accordingly, a primary object of the present invention is to provide a fixture box that resists the fatigue resulting from dynamic loads.

A further object of the invention is to provide a fixture box which can more adequately meet the test standards for ceiling fan boxes.

Yet a further object of the invention is to provide a fixture box to which a fixture or ceiling fan can be directly mounted.

Another object of the invention is to provide a fixture box which resists bending caused by cyclic loading and unloading.

Yet another object to the invention is to provide a fixture box having a mounting bracket which resists fatigue and breaking off.

The foregoing objects are basically attained by providing a fixture box, the combination comprising a top portion; a side portion having an inner surface and a top edge, the top edge being coupled to the top portion and the side portion extending substantially perpendicular to the top portion; and a continuous flange coupled to the side portion along the entire periphery of the inner surface of the side portion and projecting inwardly substantially perpendicular to the side portion, the continuous flange having a pair of mounting holes extending therethrough, the pair of mounting holes being adapted to receive a mounting means coupled to the fixture, whereby the fixture is mounted to the continuous flange.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form part of this original disclosure.

DETAILED DESCRIPTION OF PREFERRED EMBODIMENTS

Figure 1:
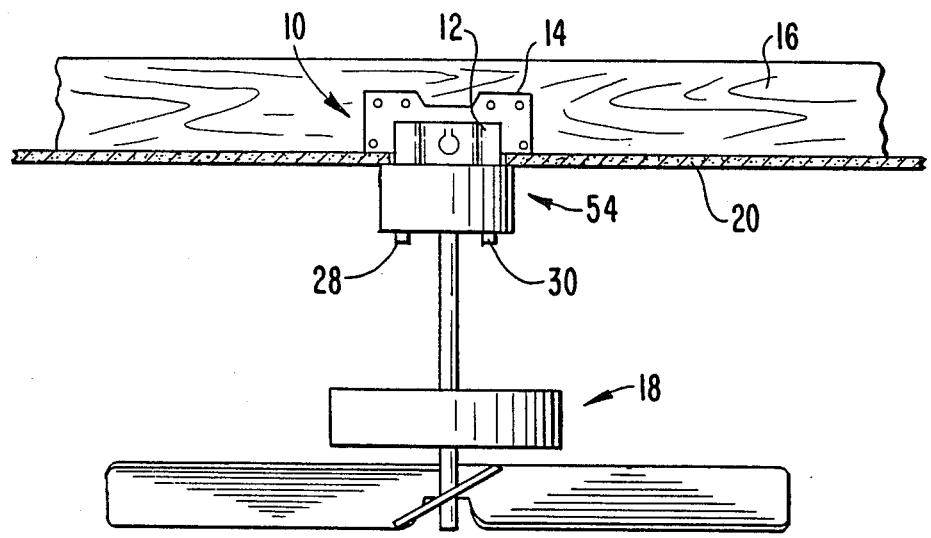
FIG. 1 is a side elevational view of the fixture box of the present invention, shown mounted to a joist and having a ceiling fan mounted thereto.

As seen in FIG. 1, fixture box 10 includes a housing 12 and a mounting bracket 14 rigidly secured to the housing 12 and to a joist 16. A ceiling fan 18 is mounted to housing 12 so that the fan is supported below a ceiling panel 20.

Figure 2:
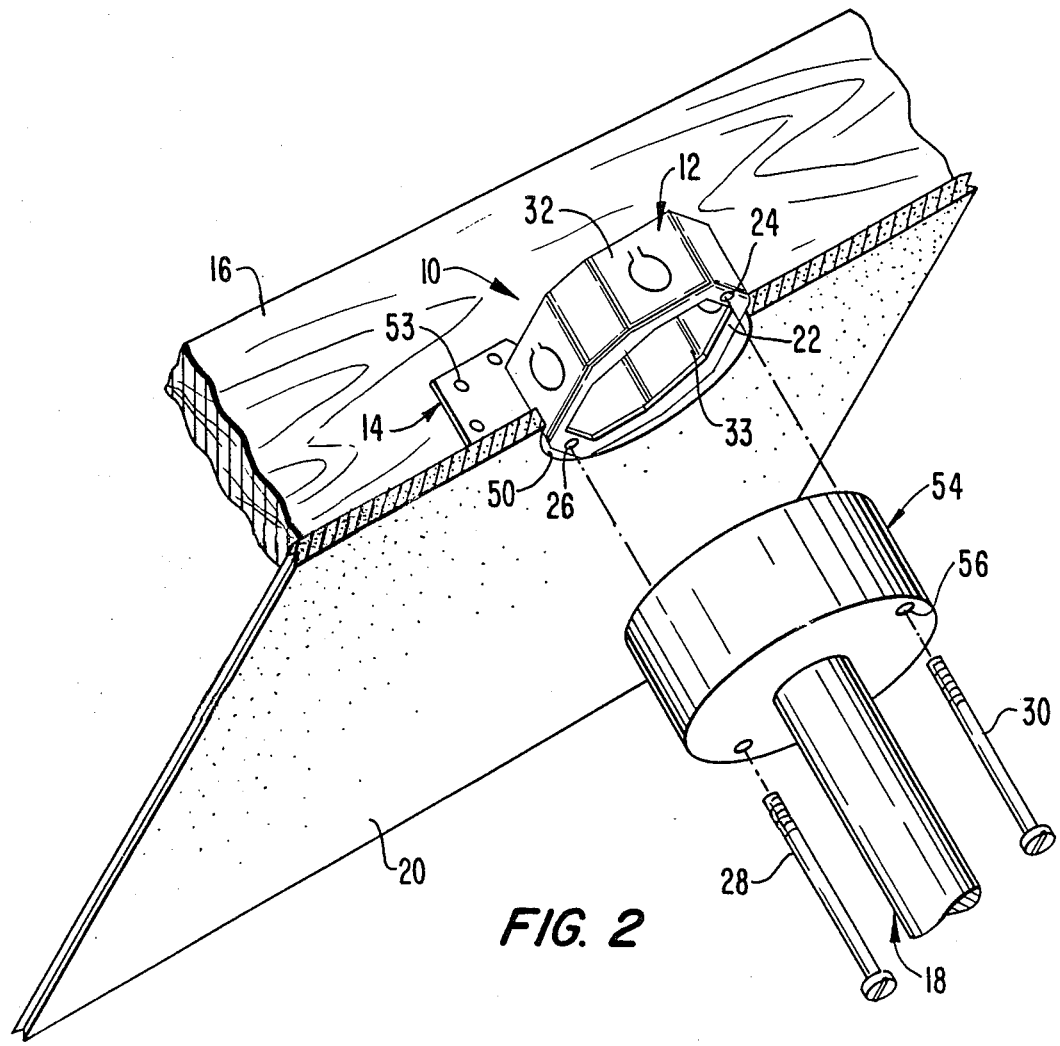
FIG. 2 is an enlarged fragmentary perspective view of the fixture box shown in FIG. 1 with the ceiling fan housing of the ceiling fan shown about to be secured to the fixture box by mounting screws.

As seen in FIG. 2, fixture box 10 includes a continuous flange 22 on housing 12 having a pair of threaded mounting holes 24 and 26. Mounting holes 24 and 26 each threadedly receive a respective fan mounting screw 28 or 30 which mounts ceiling fan 18 to fixture box 10.

Figure 3:
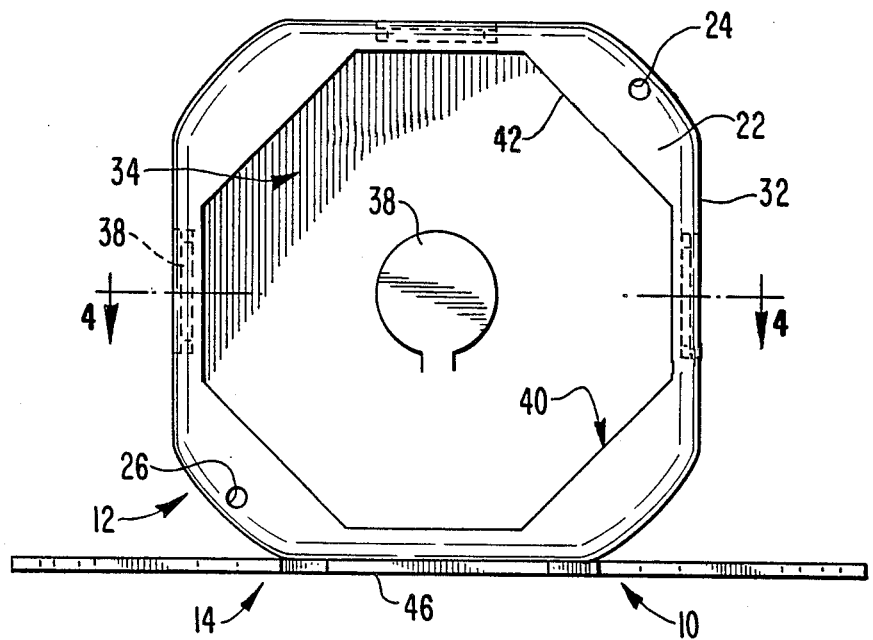
FIG. 3 is a bottom plan view of the fixture box of the present invention, showing the continuous flange having mounting holes therein for mounting a fixture or ceiling fan.
Figure 4:
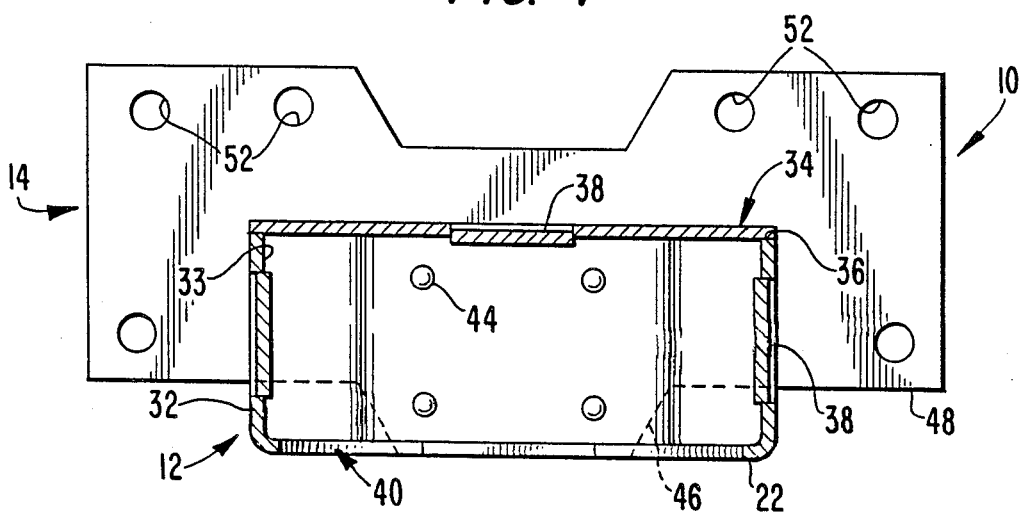
FIG. 4 is a cross sectional side elevational view of the fixture box of FIG. 3, taken along line 4—4 in FIG. 3 and showing the fixture box housing mounted to the mounting bracket by rivets.

Referring now more specifically to the construction of fixture box 10, housing 12 is preferably constructed of sheet metal and includes a continuous, substantially octagonal side portion 32 having a continuous, substantially octagonal inner surface 33 seen in FIG. 4. Continuous flange 22 is integrally formed with side portion 32 of housing 12. As seen in FIG. 3 and 4, housing 12 also includes a top planar portion 34 which is secured to the top edge 36 of side portion 32 by welding or other appropriate securing means.

Housing 12 also includes a number of break out windows 38 which can be selectively broken off to create openings for passing electrical wires therethrough. Break out windows 38 are positioned in side portion 32 and in top portion 34 and are preferably formed from the sheet metal of side portion 32 and top portion 34. Typically, break out window 38 project slightly inwardly or outwardly from the surrounding side or top portion of housing 12.

Referring now more specifically to the construction of continuous flange 22, the flange projects inwardly substantially perpendicular to the planar segments of side portion 32 and has an inner edge 40 defining an opening composed of a number of segments 42 preferably arranged in an eight-sided shape. The eight-sided arrangement of segments 42 can be substantially octagonal. Mounting holes 24 and 26 are preferably each positioned adjacent a respective one of a pair of oppositely facing segments 42. Preferably, mounting holes 24 and 26 are adjacent a respective corner of side portion 32.

Mounting holes 24 and 26 are preferably each closely adjacent to side portion 32 so that the moment-arm of the force applied through the surrounding portion of continuous flange 22 to side portion 32 is reduced. The spacing between the outer periphery of each mounting hole and the inner surface 33 of side portion 32 is preferably about 0.0625 to about 0.125 inch.

Thus, fixture box 10 of the present invention is especially advantageous, as compared to known fixture boxes, for resisting the relatively high dynamic loading which occurs when the ceiling fan is unbalanced. The novel construction of continuous flange 22 permits it to withstand the fatigue induced by the cyclic unloading and loading of an unbalanced fan load.

Since continuous flange 22 extends continuously around the entire periphery of the inner surface 33 of side portion 32, the flange resists bending when a load such as ceiling fan 18 is secured to the flange. The portions of flange 22 surrounding mounting holes 24 and 26 resist bending and flexing since they are supported and strengthened by the remaining portions of flange 22. Mounting holes 24 and 26 can also be unthreaded holes to permit passage therethrough of a bolt from a nut and bolt arrangement for mounting ceiling fan 18 to fixture box 10.

With regard now to mounting bracket 14, housing 12 is preferably rigidly secured to mounting bracket 14 so that fixture box 10 can be easily and securely mounted to joist 16 with continuous flange 22 properly oriented to receive and mount a fixture, especially a ceiling fan. Preferably, a number of armor piercing rivets 44 seen in FIG. 4 are punched through side portion 32 and into mounting bracket 14 to rigidly secure housing 12 to mounting bracket 14. In a modification, housing 12 and mounting bracket 14 can be secured together by welding.

Mounting bracket 14 preferably includes a bottom trapezoidal projection 46 seen in FIG. 4 having a side to side dimension corresponding to the side to side dimension of the portion of side portion 32 which directly contacts mounting bracket 14. Housing 12 can be riveted to bottom projection 46 such that continuous flange 22 is downwardly offset from bottom side edges 48 of the mounting bracket 14. As seen in FIG. 2, this arrangement permits mounting bracket 14 to be secured to joist 16 such that its bottom side edges 48 lie above the top of ceiling panel 20 while permitting fixture box 10 to protrude through hole 50 in ceiling panel 20. With suitable dimensioning, housing 12 can be secured to mounting bracket 14 such that continuous flange 22 is substantially flush with the bottom surface of ceiling panel 20, thereby affording a neat appearance when fixture box 10 is installed.

The top to bottom dimension of housing 12 is preferably about 1.5 to about 2.125 inches. Additionally, although a fixture box 10 is described as including a housing and a mounting bracket, fixture box 10 can be modified to include only a housing. In that modification, the housing can be mounted to a joist or other structural support by appropriate means, such as an approved bar hanger.

Mounting bracket 14 also includes a number of joist mounting holes 52, threaded or unthreaded, for receiving therein wood screws 53 or other appropriate securing means for securing mounting bracket 14 to joist 16 as seen in FIG. 1. Preferably, several of joist mounting holes 52 are mounted above housing 12 to reduce the load travel leverage or moment-arm on the wood screws. Also, mounting bracket 14 preferably has a relatively wide side to side dimension, greater than that of housing 12, to enhance the stability of fixture box 10 when it is mounted to joist 16.

The use of fixture box 10 to support ceiling fan 18 in a secure position adjacent ceiling panel 20 can be accomplished as follows. Housing 12 is aligned with hole 50 in ceiling panel 20 such that continuous flange 22 is substantially flush with the bottom surface of ceiling panel 20. Wood screws 53 are inserted through joist mounting holes 52 to secure mounting bracket 14 to joist 16. If not already removed, break out windows 38 can be removed as appropriate to prepare for the insertion of electrical wires. Next, ceiling fan 18 is raised such that fan housing 54 is closely adjacent to or in contact with the bottom surface of ceiling panel 20. Also, fan housing holes 56 are aligned with mounting holes 24 and 26.

Prior to threading fan mounting screws 28 and 30 into mounting holes 24 and 26, electrical wires inserted through fixture box 10 can be appropriately coupled to electrical wires of ceiling fan 18.

Fan mounting screws 28 and 30 are then inserted through fan housing holes 56 to threadedly engage mounting holes 24 and 26. The weight of ceiling fan 18 is thus supported from fixture box 10 by fan mounting screws 28 and 30. Alternatively, the fan housing alone can be connected to the fixture box and then the remaining fan structure can be connected to the fan housing.

When the blades of ceiling fan 18 rotate during operation of the fan, any twisting or torqueing force resulting therefrom is transmitted through fan mounting screws 28 and 30 to continuous flange 22. However, the novel construction of continuous flange 22 resists bending and flexing due to these transmitted twisting forces. The superior ability of continuous flange 22 to resist bending or flexing (which leads to fatigue) gives fixture box 10 of the present invention a long, useful life. The prolonged useful life of box 10 thus postpones the often difficult and time consuming task of replacing the box.

Also, although the invention has been described with respect to a fixture box and an embodiment for mounting a ceiling fan to a ceiling, fixture box 10 can be used to mount electrical fixtures of various types, such as e.g., overhead lights. Also, fixture box 10 can be used to mount such fixtures to the walls or other surfaces of a building.

While various advantageous embodiments have been chosen to illustrate the invention, it will be understood by those skilled in the art that various changes and modification can be made therein without departing from the scope of the invention as defined in the appended claims.

What is claimed is:

1. A fixture box adapted to mount and support a fixture, the combination comprising:
    a top portion;
    a side portion having an inner surface and a top edge, said top edge being coupled to said top portion and said side portion extending substantially perpendicular to said top portion; and
    a continuous flange coupled to said side portion along the entire periphery of said inner surface of said side portion and projecting inwardly substantially perpendicular to said side portion, said continuous flange having a pair of mounting holes extending therethrough, said pair of mounting holes being adapted to receive a mounting means coupled to the fixture, whereby the fixture is mounted to said continuous flange.

2. A fixture box as claimed in claim 1, wherein said continuous flange includes a inner edge having a plurality of segments forming a substantially octagonal shape.

3. A fixture box as claimed in claim 2, wherein one of said pair of mounting holes is positioned adjacent a first of said segments and the other of said pair of mounting holes is positioned adjacent a second of said segments which is opposed to said first of said segment.

4. A fixture box as claimed in claim 1, wherein each of said of pairs of mounting holes is positioned closely adjacent to said side portion.

5. A fixture box as claimed in claim 1, wherein said continuous flange is integrally formed with said side portion.

6. A fixture box as claimed is claim 1, wherein said side portion has a substantially octagonal shape.

7. A fixture box as claimed in claim 1, wherein the height of the fixture box, as measured from the outside of said continuous flange to the outside of said top portion, is approximately 1.5 inches.

8. A fixture box as claimed in claim 1, wherein the height of the fixture box, as measured from the outside of said continuous flange to the outside of said top portion, is approximately 2.125 inches.

9. A fixture box as claimed in claim 1, wherein said top portion and said side portion each include a break-out window which is adapted to receive electrical wires after a portion thereof is broken away.

10. A fixture box as claimed in claim 1, wherein said side portion includes means for coupling the fixture box to a support.

11. A fixture box as claimed in claim 1, and further comprising
    a bracket for mounting the fixture box to a support and means, coupled to said bracket and to said side portion, for coupling said bracket to said side portion.

12. A fixture box as claimed in claim 11, wherein said means for coupling said bracket to said side portion includes a plurality of rivets.

13. A fixture box as claimed in claim 11, wherein said bracket includes a centrally located bottom projection.

14. A fixture box as claimed in claim 11, wherein said bracket includes a plurality of external support holes for receiving a plurality of external fasteners.

15. A fixture box adapted to mount and support a ceiling fan, the combination comprising:
    a top portion;
    a side portion having an inner surface and a top edge, said top edge being coupled to said top portion and said side portion extending substantially perpendicular to said top portion; and
    a continuous flange coupled to said side portion along the entire periphery of said inner surface of said side portion and projecting inwardly substantially perpendicular to said side portion, said continuous flange having a pair of mounting holes extending therethrough, said pair of mounting holes being adapted to receive a mounting means coupled to the ceiling fan, whereby the ceiling fan is mounted to said continuous flange.

16. A fixture box as claimed in claim 15, wherein said continuous flange includes an inner edge having a plurality of segments forming a substantially octagonal shape.

17. A fixture box as claimed in claim 16, wherein one of said pair of mounting holes is positioned adjacent a first of said segments and the other of said pair of mounting holes is positioned adjacent a second of said segments which is opposed to said first of said segments.

18. A fixture box as claimed in claim 17, wherein each of said pairs of mounting holes is positioned closely adjacent to said side portion.

19. A fixture box as claimed in claim 18, wherein said continuous flange is integrally formed with said side portion.

20. A fixture box as claimed in claim 19, wherein said top portion and said portion each include a break-out window which is adapted to receive electrical wire after a portion thereof is broken away.

* * * * *